MAGNETIC "PEN" FOR A GRAPHIC TABLET

Filed June 19, 1967

INVENTORS
LARRY A. JONES &
RONALD B. GOYER

BY [signature]
ATTORNEY 3,532,817
Patented Oct. 6, 1970

3,532,817

MAGNETIC "PEN" FOR A GRAPHIC TABLET

Larry A. Jones, Van Nuys, and Ronald B. Goyer, North Hollywood, Calif., assignors to RCA Corporation, a corporation of Delaware Filed June 19, 1967, Ser. No. 647,167
Int. Cl. G08b *5/22;* G08c *21/00*
U.S. Cl. 178—18 4 Claims

ABSTRACT OF THE DISCLOSURE

A reference surface, an element which is slideable over the reference surface, and a body portion which is universally joined to the slideable element. An electromagnet is fixed to the slideable element so that its magnetic flux lines remain at fixed angles to the reference surface.

BACKGROUND OF THE INVENTION

Copending application, Ser. No. 468,076 for "Data Processing," filed June 29, 1965 by Morton H. Lewin, now Pat. No. 3,466,646 issued Sept. 9, 1969 and assigned to the same assignee as the present application, deals with a device for translating analog positional information into binary information. In the operation of this device, the user traces over a flat "writing" surface with a "pen," and the pen's position periodically is sensed and is translated into binary information. The pen is simply a means for producing a localized magnetic field and is the signal transmitter. The tablet includes successive layers of winding which are the signal receivers. One group of these windings produces outputs in binary form indicative of the pen position in one coordinate, such as the X coordinate, and the other group of windings produces outputs in binary form indicative of the pen position along with the Y coordinate. Each winding of a group is coded (wound) to represent a different power in a binary system of notation.

It has been found in practicing the invention above, that it is important that the angle between the flux lines of the magnetic field generated by the pen and the surface of the tablet remain constant, preferably at 90 degrees, as the pen is moved along the surface. The magnetic field produced by the pen is highly localized and it is desired that this localized field intersect each layer of the tablet in the same relative location. When the angle between the pen and the surface of the tablet changes, the relative positions in the successive tablet layers intersected by the localized magnetic field change and this "parallax effect" introduces errors in the binary information produced by the tablet.

The objective of this invention is to provide a magnetic pen which produces a magnetic field whose lines of flux intersect the writing surface of the tablet at fixed angles as the pen is moved along the surface of the tablet, regardless of the angle between the pen body and the surface.

BRIEF SUMMARY OF THE INVENTION

The magnetic pen of the invention includes a body portion, a slideable element universally coupled to one end of the body portion and an electromagnet fixed to the slideable element. In a preferred form of the invention, the body portion is hollow and includes wires which carry the current for energizing the electromagnet and also control wires. The handle may also include a manually controllable switch in series with at least one of the wires for starting and interrupting the translation of analog positional information to binary information.

DETAILED DESCRIPTION

Figure 1:
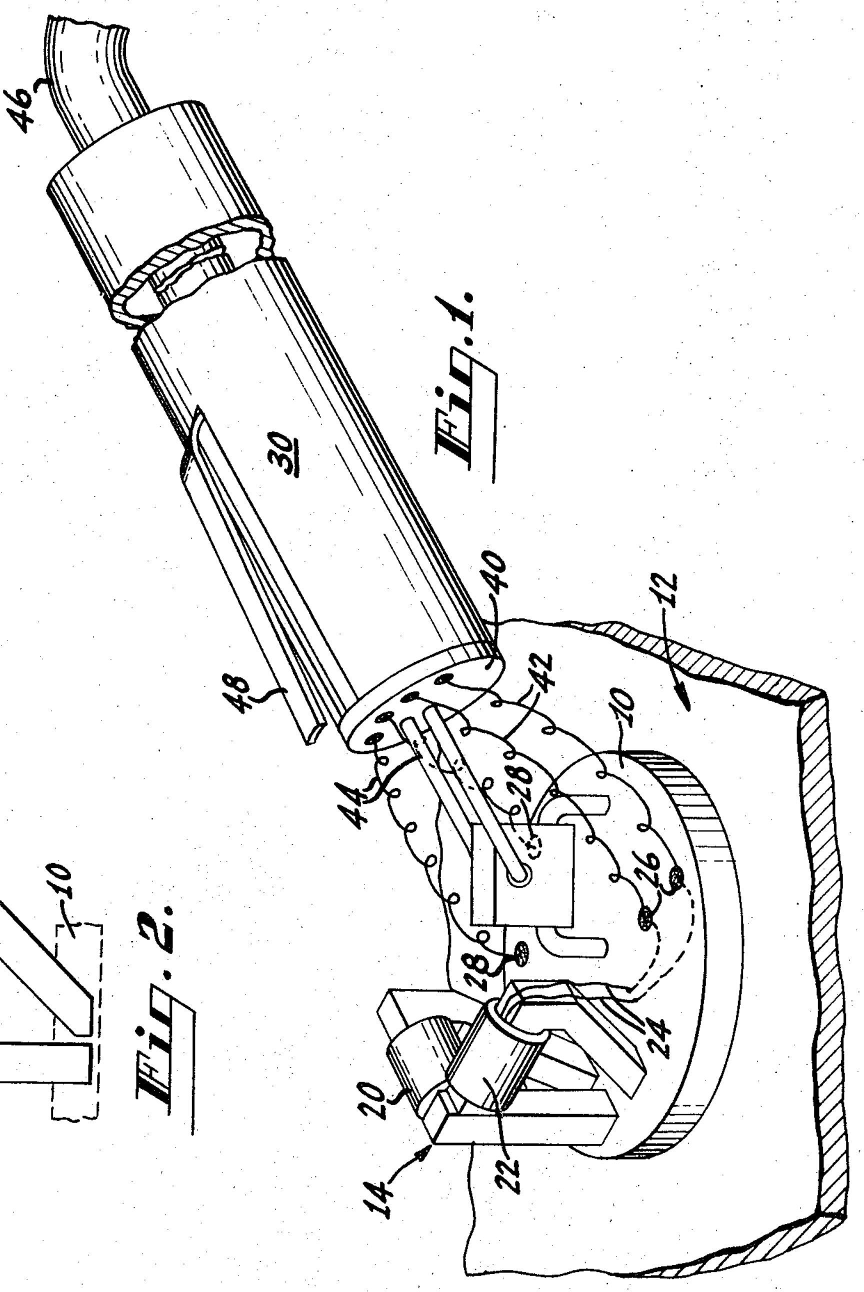
FIG. 1 is a perspective, partially broken-away view of the magnetic pen of the invention.
Figure 2:
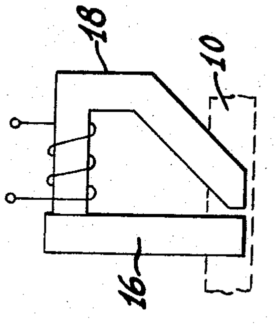
FIG. 2 is a plan view of the portion of the electromagnet of FIG. 1.

The magnetic pen of FIG. 1 includes a circularly shaped element 10 having a flat lower surface and which is slideable along the "writing" surface of the tablet 12. The tablet is shown only schematically, and details of its structure are discussed in the copending application mentioned above. The slideable element 10 is preferably formed of a tough plastic material. An electromagnet 14 consisting of a rod-shaped piece and two C shaped pieces is secured at its pole pieces in the plastic of the slideable element 10. The rod-shaped piece is shown more clearly at 16 in FIG. 2 and one of the C pieces, both of which are glued at one end to the piece 16, is shown at 18 in this same figure. The plastic of the slideable element is shown in part in phantom view at 10 also in FIG. 2.

The electromagnet 14 is formed of material such as a linear type ferrite, i.e. one which has no remanence. The two coils of the magnet are shown at 20 and 22 and each is connected by a pair of wires to a pair of terminals. For example, the pair of wires 24 for coil 22 is embedded for part of its length in the plastic of the slideable element and connects to the terminals 26. The pair of wires (not visible) for the coil 20 connects to the terminals 28. The electromagnet 14 produces two orthogonally related fields and is operated in the way discussed in connection with FIG. 15 of the copending application.

Figure 3:
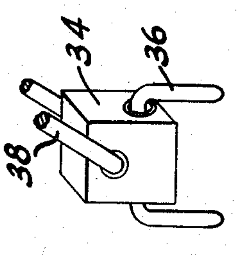
FIG. 3 is a perspective drawing of the universal joint of the arrangement of FIG. 1.

The body portion 30 of the pen is mechanically connected to the slideable element 10 by the universal joint which is shown more clearly in FIG. 3. This universal joint comprises a block 34 of non-magnetic material and two U shaped wires 36 and 38 which pass through orthogonally related holes in the block 34. The ends of the U shaped element 36 are embedded in the plastic of the slideable element 10 and the ends of the U shaped element 38 are embedded in the end cap 40 of the pen body 30.

The body 30 of the pen is electrically connected to the slideable element 10 by two pairs 42 and 44 of coiled conductors. These conductors are resilient and, for example, may be made of vinyl clad stranded wires. The purpose of using such wires is to avoid strain on the terminals of the slideable element, and the corresponding terminals of the end cap 40.

In one practical circuit, input cable 46 of the pen body 30 consists of 3 pairs of wires. The first and second pairs extend to the coils 20 and 22 of the electromagnet 14. The third pair of wires extends to the logic circuits of the device and the switch 48 is in series therewith.

In the operation of the arrangement of FIG. 1, the electromagnet 14 is energized each time a pulse is applied to the coils 20 and 22. However, the device does not translate its position into binary information nor is the electro-magnet energized until the operator depresses the switch 48 on the pen body. When this switch is depressed, the logic circuits and electromagnet are actuated and the binary information produced by the layers of the tablet is applied to the computer associated with the tablet. (As an alternative, the switch may be in series with the wires leading to the coils in which case only two pairs of wires are needed for the cable 46.)

In one practical form of the present invention, the slideable element 10 has a diameter of 0.7 inch and a thickness of 0.125 inch and the pen body has a thickness of 0.45 inch. Both diameters can be reduced. For example, the diameter of the slideable element can be made approximately 0.3 to 0.4 inch and the pen body approximately 0.25 to 0.3 inch. Further, while the slideable element 10 is shown to be of circular shape, it is to be understood that it can be of other shape instead. For example, the slideable element may be of wedge or pie shape and the magnetic heads located at the narrow end of the wedge or the pointed end of the pie, as the case may be.

There may be substituted for the universal joint shown a ball and socket universal joint. However, in the present application the universal joint of FIG. 3 does have a very important advantage, namely that it transmits torsional motion to the slideable element 10 giving the operator better control of the part of the slideable element 10 containing the electromagnet 14.

What is claimed is:

1. An arrangement for generating a magnetic field the lines of flux of which remain at fixed angles to a reference surface comprising, in combination;

a slideable element one surface of which is adapted to ride on said reference surface;

electromagnet means fixed to said slideable element for producing a magnetic field orthogonal to said surface and which remains orthogonal to said surface as the slideable element is moved;

an elongated body portion; and a universal coupling connecting one end of said body portion to said slideable element for permitting a user to change the angle between said body portion and said reference surface without changing the orthogonal relationship betwen said magnetic field and said reference surface.

2. An arrangement as set forth in claim 1 wherein said electromagnet means comprises means for generating two orthogonally related magnetic fields.

3. An arrangement as set forth in claim 1 wherein the universal coupling between said elongated body portion and said slideable element comprises a block formed with two orthogonally positioned apertures therein, a U shaped element, the base of which passes through one of said apertures and secured at its ends to an end of said body portion, and a second U shaped element, the base of which passes through the other of said apertures and secured at its end to said slideable element.

4. The improvement in a system which includes a magnetic pen having an elongated body and an electromagnet at one end thereof for generating a magnetic field, and a tablet over the surface of which the pen is moveable for receiving the magnetic field and for translating the position of the electromagnet to binary information, the improvement comprising:

means for maintaining the relative angle between said electromagnet at the end of said pen and the surface of the tablet constant as the pen moves, regardless of the angle between the pen body and said surface of said tablet, said constant angle being such as to produce a magnetic field orthogonal to the surface of said tablet, said means including a universal joint which couples said body of said pen to said end of said pen, said universal joint comprising a block formed with two orthogonally positioned apertures therein, a U-shaped element, the bases of which passes through one of said apertures and secured at its ends to an end of said body, and a second U-shaped element, the base of which passes through the other of said apertures and secured at its ends to said slideable element, said end of said pen having a surface area which is relatively large compared to the area occupied by the poles of said electromagnet and which engages the surface of the tablet of the pen over the tablet.

References Cited

UNITED STATES PATENTS 3,143,599 8/1964 Mero ............... 178—18

OTHER REFERENCES

Ahmad: "Signal Communication Apparatus," IBM Technical Disclosure, vol. 3, No. 6, November 1960.

BERNARD KONICK, Primary Examiner

R. S. TUPPER, Assistant Examiner

U.S. Cl. X.R.

178—19.